(12) United States Patent
Hamanaka (10) Patent No.: US 11,732,148 B2
(45) Date of Patent: Aug. 22, 2023

(54) INK COMPOSITION

(71) Applicant: DAI NIPPON TORYO CO., LTD., Osaka (JP)

(72) Inventor: Seiji Hamanaka, Tochigi (JP)

(73) Assignee: DAI NIPPON TORYO CO., LTD., Osaka (JP)

(*) Notice: Subject to any disclaimer, the term of this patent is extended or adjusted under 35 U.S.C. 154(b) by 435 days.

(21) Appl. No.: 16/769,946

(22) PCT Filed: Nov. 30, 2018

(86) PCT No.: PCT/JP2018/044270
§ 371 (c)(1),
(2) Date: Jun. 4, 2020

(87) PCT Pub. No.: WO2019/111822
PCT Pub. Date: Jun. 13, 2019

(65) Prior Publication Data
US 2020/0385588 A1  Dec. 10, 2020

(30) Foreign Application Priority Data

Dec. 8, 2017  (JP) ................................ 2017-235815
Mar. 29, 2018 (JP) ................................ 2018-064208
Nov. 9, 2018  (JP) ................................ 2018-211429

(51) Int. Cl.
C09D 11/101    (2014.01)
C08F 220/28    (2006.01)
(Continued)

(52) U.S. Cl.
CPC .............. *C09D 11/101* (2013.01); *C08F 2/50* (2013.01); *C08F 220/1811* (2020.02);
(Continued)

(58) Field of Classification Search
CPC ..... C09D 11/322; C09D 11/101; C09D 11/38; C09D 11/30; C09D 11/037; C08K 3/08;
(Continued)

(56) References Cited

U.S. PATENT DOCUMENTS 7,816,422 B2 * 10/2010 Watanabe .............. C09D 11/30
522/74
2004/0259976 A1 * 12/2004 Akiyama .................. C09C 1/56
523/160

(Continued)

FOREIGN PATENT DOCUMENTS

JP     2012-046561    3/2012
JP     2013-112810    6/2013
(Continued)

OTHER PUBLICATIONS

International Search Report, PCT/JP2018/044270, dated Mar. 5, 2019.
(Continued)

*Primary Examiner* — John Zimmermann
(74) *Attorney, Agent, or Firm* — Nixon & Vanderhye (57) ABSTRACT

Disclosed is an ink composition having excellent storage stability and capable of printing printed material having excellent metal tone. This active energy ray curable ink composition includes at least a scaly metal pigment, a polymerizable compound, and a photopolymerization initiator. The scaly metal pigment has a 50% volume average diameter of at least 0.05 μm and less than 0.5 μm, an average thickness of at least 5.0 nm and less than 50.0 nm, and a non-reactive solvent content of 0.01%-5.00% by mass.

4 Claims, 1 Drawing Sheet

(51) Int. Cl.

| | |
|---|---|
| *C08F 220/30* | (2006.01) |
| *C08F 220/18* | (2006.01) |
| *C08F 2/50* | (2006.01) |
| *C08F 220/34* | (2006.01) |
| *C08F 236/20* | (2006.01) |
| *C08F 236/22* | (2006.01) |
| *C08K 3/08* | (2006.01) |
| *C08K 5/5397* | (2006.01) |
| *C09D 11/107* | (2014.01) |
| *C09D 11/322* | (2014.01) |

(52) U.S. Cl.
CPC ...... *C08F 220/281* (2020.02); *C08F 220/285* (2020.02); *C08F 220/301* (2020.02); *C08F 220/34* (2013.01); *C08F 236/20* (2013.01); *C08F 236/22* (2013.01); *C08K 3/08* (2013.01); *C08K 5/5397* (2013.01); *C09D 11/107* (2013.01); *C09D 11/322* (2013.01); *C08K 2003/0812* (2013.01); *C08K 2201/003* (2013.01); *C08K 2201/016* (2013.01)

(58) Field of Classification Search
CPC ........ C08K 2201/005; C08K 2201/016; C08K 2201/003; B22F 1/068; B41M 5/0011
See application file for complete search history.

(56) References Cited

U.S. PATENT DOCUMENTS

| | | | | |
|---|---|---|---|---|
| 2007/0242124 A1* | 10/2007 | Tomita | ................. | C08F 220/56 347/105 |
| 2008/0213518 A1* | 9/2008 | Oyanagi | ................... | B41J 2/14 428/209 |
| 2010/0009136 A1* | 1/2010 | Oyanagi | .............. | C09D 11/322 524/556 |
| 2012/0052261 A1* | 3/2012 | Aoyama | .............. | B41M 5/0011 347/20 |
| 2013/0196125 A1 | 8/2013 | Toyoda et al. | | |
| 2014/0302291 A1 | 10/2014 | Toyoda et al. | | |
| 2015/0315397 A1 | 11/2015 | Toyoda et al. | | |
| 2016/0009933 A1 | 1/2016 | Toyoda et al. | | |
| 2016/0340532 A1 | 11/2016 | Toyoda et al. | | |
| 2017/0001242 A1 | 1/2017 | Nakao | | |
| 2017/0355868 A1* | 12/2017 | Saiga | .................... | C09D 11/40 |
| 2019/0031897 A1* | 1/2019 | Hirade | .................. | B41M 7/009 |

FOREIGN PATENT DOCUMENTS

| | | |
|---|---|---|
| JP | 2013-158933 | 8/2013 |
| JP | 2013-230637 | 11/2013 |
| JP | 2015-196818 | 11/2015 |
| JP | 2015-212018 A | 11/2015 |
| JP | 2016-027129 A | 2/2016 |
| JP | 5855782 | 2/2016 |
| JP | 2017-002162 | 1/2017 |
| JP | 2017-088821 A | 5/2017 |
| WO | 2011/064162 A2 | 6/2011 |
| WO | WO 2015-146977 | 10/2015 |

OTHER PUBLICATIONS

Notice of reasons for refusal dated May 7, 2019, corresponds to JP2017-235815.
Notice of reasons for refusal dated Jun. 4, 2017, corresponds to JP2018-064208.
Notice of reasons for refusal dated Dec. 10, 2019, corresponds to JP2018-211429.
Patent assessment dated Aug. 6, 2019, corresponds to JP2017-235815.
Patent assessment dated Aug. 6, 2019, corresponds to JP2018-064208.
Patent assessment dated Feb. 18, 2020, corresponds to JP2018-211429.

* cited by examiner

INK COMPOSITION

TECHNICAL FIELD

The present invention relates to an active energy ray curable ink composition, and in particular, relates to an ink composition capable of printing printed material having an excellent metal tone, and which is also excellent in storage stability.

BACKGROUND ART

Previously, in order to express an image having excellent metal tone, a technique of mixing a metallic pigment in an ink composition was known, and the mixing of metallic pigments with various forms of ink such as a water-based ink, an organic solvent-based ink, an active energy ray curable ink and the like has been investigated.

In particular, in order to realize metal tone designs, a scaly metallic pigment has been suitably used as a metallic pigment, but in order to realize an image having excellent metal tone using such a scaly metallic pigment, it is necessary to uniformly orient the scaly metallic pigment within the coating. In order to improve the orientation of the scaly metallic pigment, various techniques are known.

For example, Patent Documents 1 and 5 disclose active energy ray curable inkjet ink compositions comprising a polymerizable compound, a vapor deposited metallic pigment, and a resin having a specified acid value.

Because this vapor deposited metallic pigment can easily cause clogging of an inkjet head, in order to solve this, a miniaturized flake shaped metallic pigment has been proposed (Patent Document 2). Further, in order to obtain a metal glossiness, an ultraviolet ray curable inkjet ink used in combination with a small metallic pigment and a specified organic solvent has been proposed (Patent Document 3). Furthermore, an ink composition using a metallic pigment which has been surface treated with a fluorine-based compound and which does not at all include an organic solvent has also been proposed (Patent Document 4).

Patent Document 1: Japanese Patent No. 5855782
Patent Document 2: PCT international Publication No. WO2015/146977
Patent Document 3: Japanese Unexamined Patent Application, Publication No. 2017-2162
Patent Document 4: Japanese Unexamined Patent Application, Publication No. 2013-158933
Patent Document 5: Japanese Unexamined Patent Application, Publication No. 2012-46561

DISCLOSURE OF THE INVENTION

Problems to be Solved by the Invention

However, these ink compositions include much solvent, whereby the storage stability of the ink deteriorates, and which gives rise to blurring of the image caused by poor curing. In the image forming process, heating is required, which often gives rise to corrosion of the printer head, which leads to lack of versatility. On the other hand, for inks which are completely free of solvent, agglomeration of the scaly metallic pigment readily occurs, and this also deteriorates the storage stability of the ink. Moreover, for an ink with deteriorated storage stability, there has been a tendency for the metal tone to deteriorate compared to the ink before storage.

The objective of the present invention is to provide an active energy ray curable ink composition which is capable printing with versatility and having excellent metal tone, and which is excellent in storage stability. Furthermore, a method for predicting the metal tone of a printed material is provided.

Means for Solving the Problems

The inventors of the present invention achieved the objective of the invention by the following.

1. An active energy ray curable ink composition comprising at least (A) a scaly metallic pigment, (B) a polymerizable compound, and (D) a photo initiator, wherein the scaly metallic pigment has a 50% volume average diameter of 0.05 μm or more and less than 0.5 μm and an average thickness of 5.0 nm or more and less than 50 nm, and a content of an non-reactive solvent is 0.01 weight % to 5.00 weight %.
2. An active energy ray curable ink composition according to 1, further comprising a resin (P) with a weight average molecular weight of 12000 or less, and With an acid value of 5 to 100.
3. An active energy ray curable ink composition according to 1 or 2, wherein the polymerizable compound comprises 50 weight % or more of a polyfunctional monomer.
4. An active energy ray curable ink composition comprising at least (A) a scaly metallic pigment, (B) a polymerizable compound, and (C) a nonionic dispersant.
5. An active energy ray curable ink composition according to 4, wherein a weight ratio (C/A) of the (C) nonionic dispersant with respect to the (A) scaly metallic pigment is 0.1 to 2.0.
6. An active energy ray curable ink composition according to 4 or 5, wherein a weight ratio (C/B) of the (C) nonionic dispersant with respect to the (B) polymerizable compound is 0.001 to 0.02.
7. An active energy ray curable ink composition according to any one of 4 to 6, wherein a weight average molecular weight of the (C) nonionic dispersant is 500 to 5,000.
8. An active energy ray curable ink composition according to any one of 4 to 7, wherein the (A) scaly metallic pigment has a 50% volume average diameter of 0.05 μm or more and less than 0.5 μm and an average thickness of 5.0 nm or more and less than 50 nm, and an aspect ratio (50% volume average diameter/average thickness) of 4 to 50.
9. An active energy ray curable ink composition comprising at least (A) a scaly metallic pigment, (B) a polymerizable compound, and (D) a photo initiator, wherein an L* value of a liquid interface of the active energy ray curable ink composition is 30 or more.
10. An active energy ray curable ink composition according to 9, wherein the (B) polymerizable compound has a specific gravity of 0.98 to 1.15, and a surface tension of 33.0 to 45.0 mN/m.
11. An active energy ray curable ink composition according to 9 or 10, wherein the (A)scaly metallic pigment has a 50% volume average diameter of 0.05 μm or more and less than 0.5 μm and an average thickness of 5.0 nm or more and less than 50 nm, and an aspect ratio (50% volume average diameter/average thickness) of 4 to 50.
12. A method for predicting a metal tone of a printed material by an active energy ray curable ink composition comprising at least (A) a scaly metallic pigment, (B) a polymerizable compound, and (D) a photo initiator, comprising predicting by measuring an L* value of a liquid interface of the ink composition.

Effects of the Invention

According to the present invention, it is possible to print with greater versatility with an ink composition having an excellent metal tone, and which is also excellent in storage stability.

PREFERRED MODE FOR CARRYING OUT THE INVENTION

Below, the ink composition of the present invention is explained in detail.

Ink Composition

The ink composition of the first embodiment of the present invention is an active energy ray curable ink composition comprising at least (A) a scaly metallic pigment, (B) a polymerizable compound, and (D) a photo initiator, characterized in that the scaly metallic pigment has a 50% volume average diameter of 0.05 μm or more and less than 0.5 μm and an average thickness of 5.0 nm or more and less than 50 nm.

The ink composition of the second embodiment of the present invention is an active energy ray curable ink composition characterized in comprising at least (A) a scaly metallic pigment, (B) a polymerizable compound, and (C) a nonionic dispersant.

The ink composition of the third embodiment of the present invention is an active energy ray curable ink composition comprising at least (A) a scaly metallic pigment, (B) a polymerizable compound, and (D) a photo initiator, characterized in that an L* value of a liquid interface of the active energy ray curable ink composition is 30 or more, and further characterized in that the (B) polymerizable compound has a specific gravity of 0.98 to 1.15, and a surface tension of 33.0 to 45.0 mN/m.

(A) Scaly Metallic Pigment

The scaly metallic pigment used in the ink composition of the present invention is a metallic pigment with a thin flat form such as a leaf, and for example, can be obtained by a production method applying deposition. As the scaly metallic pigment, a metallic pigment of aluminum, nickel, chrome, tin, copper, silver, platinum, gold and the like may be mentioned, and aluminum is preferable. The average particle diameter and aspect ratio may be suitably selected and used, and may be used as one type individually, or two or more types may be used in combination.

The scaly metallic pigment of the present invention has a 50% volume average diameter of 0.05 μm or more and less than 0.5 μm and an average thickness of 5.0 nm or more and less than 50 nm.

In the present invention, the 50% volume average diameter indicates the 50% particle diameter ($D_{50}$) of the volume standard particle size distribution, and can be obtained from the particle size distribution measured by using a flow type particle image analyzer. As the flow type particle image analyzer, the trade name "FPIA-3000S" manufactured by Sysmex Corporation may be mentioned. Further, the measurement conditions of the flow type particle image analyzer are as below.

imaging unit: high power imaging unit
magnification: 40× (ocular lens 20×, objective lens 2×)
measurement mode: HPF measurement mode
measurement time: about 2 min.
measurement solvent: ethanol
binarization threshold coefficient: 85%
dilution by the solvent when measuring: 2000×
sheath liquid: ethanol The scaly metallic pigment preferably has a 50% volume average diameter of 0.05 μm or more and less than 0.5 μm. When the 50% volume average diameter becomes less than 0.05 μm or 0.5 μm or more, a metal tone cannot be obtained, and the printed material will not have a metal glossiness. Further, the average thickness is preferably 5.0 nm or more and less than 50 nm. If the average thickness becomes 50 nm or more, the metal tone cannot be obtained, and the printed material will not have a metal glossiness. Further, if the average thickness becomes less than 5 nm, a metal gloss cannot be obtained because the scaly metallic pigment becomes too thin. The average thickness is preferably 5.0 to 20.0 nm, more preferably 10.0 to 18.0 nm.

The average thickness is determined as below. Several drops of the scaly metallic pigment diluted in acetone are dropped onto a glass substrate, and allowed to dry naturally. Next, using an atomic force microscope (trade name: "Nanopics 1000", manufactured by Seiko Instruments K.K.), the scaly metallic pigment which has been forcefully oriented on the glass substrate is sampled at 20 points, and the respective thicknesses are measured using the upping mode. Then, among the thicknesses of the measured 20 points, three each of the highest values and lowest values of the thickness are discarded, and the average value of the remaining 14 points is determined, and this average value is taken as the average thickness.

The scaly metallic pigment of the present invention may be manufactured by a well-known method, for example the method disclosed in Patent Document 2. For example, an undercoat layer having compatibility with the metallic pigment is provided on a film support body, and then a metal layer is provided on this undercoat layer by a vacuum deposition method or the like. The thickness of this metal layer approximately corresponds to the thickness of the scaly metallic pigment. Next, the film support body on which the metal layer has been provided is disposed in an ultrasound dispersion device filled with a solvent which dissolves the undercoat layer, and ultrasound dispersion treatment is carried out. By this ultrasound dispersion treatment, the metal layer is detached from the film support body, and further by suitably selecting the dispersion time, the average diameter can be adjusted.

Further, it is also possible to apply a method of shearing to a prescribed particle diameter before the ultrasound dispersion treatment, and after this, detaching in the ultrasound dispersion device filled with the same solvent. For further refining, a high pressure jet is also effective. By drying the scaly metallic pigment dispersion liquid obtained in such a way, or by a method where after the dispersion liquid is prepared, a part of the solvent is replaced with a polymerizable compound, or the like, it can be used for the ink composition.

In the ink composition of the present invention, the content of the scaly metallic pigment is preferably 0.3 to 5.0 weight %.

Active Energy Ray Curing

As the active energy ray in the present invention, common active energy rays such as visible light rays, ultraviolet light rays, electron beams and the like may be used, and in particular, ultraviolet rays are preferable. As the active energy ray source, an ultraviolet ray source such as a mercury lamp, metal halide lamp, xenon lamp, excimer laser, dye laser, LED lamp or toe like, and an electron beam accelerator or the like may be used. The irradiated energy amount (cumulative light amount) of the active energy ray is preferably 200 to 2,000 mu/cm$^2$.

(B) Polymerizable Compound

The polymerizable compound used in the ink composition of the present invention can be used without particular limitations provided that it is a monomer which undergoes radical polymerization or cationic polymerization by irradiation of an active energy ray such as ultraviolet rays, visible light rays, an electron beam, and the like. As these polymerizable compounds, monofunctional monomers, polyfunctional monomers, cyclic ether compounds, oxetane compounds and the like may be used, and may be used individually, or may be used in combinations of two types or more. In the ink composition, the content of the polymerizable compound is preferably 70 to 90 weight %.

In the case that the polymerizable compound of the present invention is a radical polymerizable compound, an acrylate-based monomer also comprising a methacrylate is preferable, and one comprising a polyfunctional monomer is even more preferable. As the polyfunctional monomer, a 2 to 6 functional monomer can be used. The polyfunctional monomer preferably comprises 50 to 95 weight % of the polymerizable compound, and more preferably 60 to 85 weight %.

The presence of the polyfunctional monomer promotes the orientation of the scaly metallic pigment on the printed surface, and in the case of printing with a printing technique such as a one pass method, a mirror surface tone can be more strongly expressed, or in the case of printing with a printing method such as a multi pass technique, a metal tone is more strongly expressed. Herein, "mirror surface tone" refers to a fine metal glossiness which does not have a granular quality, and "metal tone" refers to a metal glossiness which has granular intervals.

As the monofunctional monomer, stearyl acrylate, tridecyl acrylate, lauryl acrylate, decyl acrylate, isodecyl acrylate, isobornyl acrylate, N-vinyl caprolactam, ethylene oxide (EO) modified 2-ethylhexyl acrylate, N-vinyl-2-pyrrolidone, N-vinylimidazol, tetrahydrofurfuryl acrylate, 2-phenoxyethyl acrylate, methoxydipropyleneglycol acrylate, ethoxydiethyleneglycol acrylate, 3-ethyl-3-oxetanyl methyl acrylate, (2-methyl-2-ethyl-1,3-dioxolane-4-yl)methyl acrylate, (2-methyl-isobutyl-1,3-dioxolane-4-yl)methyl acrylate, (5-ethyl-1,3-dioxane-5-yl)methyl acrylate, and 2-(2-vinyloxyethoxy)ethyl acrylate, and the like may be mentioned, and as the polyfunctional monomer, triethylene glycol diacrylate, 1,4-butanediol diacrylate, 1,6-hexandiol diacrylate, 1,9-nonanediol diacrylate, polytetramethyleneglycol diacrylate, neopentylglycol diacrylate, tripropyleneglycol diacrylate, dipropyleneglycol diacrylate, trimethylolpropane triacrylate, EO modified trimethylolpropane triacrylate, propylene oxide (PC) modified triemthylolpropane triacrylate, pentaerythritol triacrylate, pentaerythritol tetraacrylate, EO modified pentaerythritol tetraacrylate, ditriemethylolpropane tetraacrylate, dipentaerithrytol pentaacrylate, dipentaerithrytol hexaacrylate, and the like may be mentioned.

Among these, because of having a high storage stability when mixing in combination with a nonionic dispersant, the use of a monomer having two or more kinds of ethylene oxide or propylene oxide positions is preferable.

For example, ethylcarbitol acrylate, methoxytriethylene glycol acrylate, 2-ethylhexyl diglycol acrylate, methoxydipropylene glycol acrylate, phenoxyethyl acrylate, phenoxydiethylene glycol acrylate, diethyleneglycol diacrylate, triethyleneglycol diacrylate, dipropyleneglycol diacrylate, tripropyleneglycol diacrylate and the like may be mentioned.

In the ink composition of the present invention, a content of two or more types of monomer having an ethylene oxide or propylene oxide position is preferably 20 to 90 weight %.

Other Active Energy Ray Curable Ink Compounds

In order to increase the strength of the printed layer of the present invention, as an active energy ray curable ink compound, an acrylate oligomer or acrylate polymer or the like may also be used. As a urethane-based oligomer, commercially available CN963J75, CN964, CN965, CN966J75 (all available from Sartomer) and the like may be used. As an epoxy acrylate oligomer, commercially available CN120 and CN131B (all available from Sartomer) and the like may be used. These energy ray curable ink compounds may be used as one type individually, or may be used in combinations of two types or more.

(C) Nonionic Dispersant

The nonionic dispersant which can be used for the active energy ray curable ink composition of the present invention is a nonionic dispersant which has substantially no acid value or amine value. As the nonionic dispersant, commercially available SOLSPERSE27000 and SOLSPRESE54000 (manufactured by Lubrizol Corp.), and DISPERBYK-192 (manufactured by BYK), and the like may be used.

The weight ratio (C/A) of the (C) nonionic dispersant with respect to the (A) scaly metallic pigment is preferably 0.1 to 2.0. When 0.1 or more, the storage stability becomes even more favorable, and when 2.0 or less, the curability of the ink becomes even more favorable.

The weight ratio (C/B) of the (C) nonionic dispersant with respect to the (B) polymerizable compound is preferably 0.001 to 0.02. When 0.001 or mere, the storage stability becomes even more favorable, and when 0.02 or less, the curability of the ink becomes even more favorable.

The weight average molecular weight of the (C) nonionic dispersant is preferably 500 to 5,000, more preferably 800 to 3500, and even more preferably 1000 to 2000. Further, weight average molecular weight in the present invention is the polystyrene converted weight average molecular weight, measured by gel permeation chromatography (GPC).

(D) Photo Initiator

The photo initiator used in the ink composition of the present invention initiates the polymerization of the polymerizable compound and the other active energy ray curable compounds by irradiation of active energy rays. In the ink composition of the present invention, the content of the photo initiator is 1 to 25 weight %, preferably 3 to 20 weight %, and even more preferably 3 to 15 weight %.

As the above described photo initiator, a commercially available one may be suitably selected and used, and benzophenone-based compounds, acetophenone-based compounds, thioxanthone-based compounds, phosphene oxide-based compounds and the like may be mentioned, but from the viewpoint of curability, the wavelength of the irradiated active energy rays and the absorption wavelength of the photo initiator should preferably overlap as much as possible.

From the viewpoint of curability of the ink, 2,2-dimethoxy-1,2-diphenylethane-1-on, 2-benzyl-2-dimethylamino-1-(4-morpholinophenyl)-butane, 2,4,6-trimethylbenzoyl-diphenyl-phosphine oxide, bis(2,4,6-trimethylbenzoyl)-phenylphosphine oxide, and 2,4-diethylthioxanethone are preferable, and 2,4,6-trimethylbenzoyl-diphenyl-phosphine oxide is particularly preferable. These photo initiators may be used as one type individually, or may be used in combinations of two types or more.

Resin (P) with a Weight Average Molecular Weight of 12000 or Less, and with an Acid Value of 5 to 100

The ink composition of the present invention is characterized in preferably comprising a resin (P) with a weight average molecular weight at 12000 or less, and with an acid value of 5 to 100. The resin (P) has an acidic group such as a carboxyl group or the like with an acid value in the range of 5 to 100, and this acidic group can react with the surface of the scaly metallic pigment, and cover the surface of the scaly metallic pigment with the resin (P). Therefore, if the acid value of the above described resin (P) is 5 to 100, gelling in the ink can be effectively suppressed.

Further, the above described resin (P) is required to have a weight average molecular weight of 12000 or less, and the weight average molecular weight is preferably 6000 or less. If the weight average molecular weight of the resin (P) is 12000 or less, it is possible to more certainly prevent agglomeration of the scaly metallic pigment in the ink composition of the present invention, and nozzle clogging when inkjet printing can be prevented.

Further, if agglomeration of the scaly metallic pigment occurs, the original metal gloss of the scaly metallic pigment is reduced. The weight average molecular weight of the above described resin (P) is preferably 3000 or more. Further, in the present invention, the weight average molecular weight is a value measured by gel permeation chromatography (GPC), and polystyrene is used as the reference substance.

Because the resin (P) of the present invention has an acid value of 5 to 100 and further has a weight average molecular weight of 12000 or less, it can be dissolved in a commonly used active energy ray curable compound (for example, the below described monofunctional compound or polyfunctional compound or the like) in the active energy ray curable ink composition, and there is no requirement to dissolve in advance in a strong solvent when preparing the ink, and it can be directly blended with the above described resin (P).

The resin (P) of the present invention is not particularly limited provided that it has the above described specified acid value and weight average molecular weight, but from the viewpoint of improving the rubfastness of the printed material, an acrylic resin, epoxy resin, polyester resin, phenol resin, phthalic acid resin, alkyd resin, fluorocarbon resin, urea resin, polyurethane resin, melamine resin, polyolefin resin, vinyl chloride resin, and in addition, modified resins of these resins may be mentioned, and a polyester resin is preferable. The resin (P) may be used as one type individually, and may also be used in combinations of two types or more.

The resin (B) may be obtained by common synthesis methods, but as an example, a synthesis method of a polystyrene resin is explained. The polyester resin is a copolymer obtained by a common method of dehydration polycondensation of a polyvalent carboxylic acid and a polyalcohol which are the monomers, and the desired weight average molecular weight and acid value canal be obtained by adjusting the type and the used amount of the monomers and the degree of progress of the reaction.

The polycarboxylic acid is a carboxylic acid having two or more carboxyl groups, and as specific examples, fumaric acid, maleic acid, itaconic acid, orthophthalic acid, isophthalic acid, terephthalic acid, oxalic acid, malonic acid, succinic acid, glutaric acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 1,3-cyclobutane dicarboxylic acid, 1,3-cyclopentane dicarboxylic acid, 1,2-cyclohexane dicarboxylic acid, 1,3-cyclohexane dicarboxylic acid, 1,4-cyclohexane dicarboxylic acid, and the like may be mentioned. These polycarboxylic acids may be used as one type individually, or may be used in combinations of two types or more.

The polyalcohol is an alcohol having two or more hydroxyl groups (—OH group), and as specific examples, ethylene glycol, 1,2-propylene glycol, 1,3-propylene glycol, diethylene glycol, triethylene glycol, dipropylene glycol, tripropylene glycol, 1,2-butylene glycol, 1,3-butylene glycol, 2,3-butylene glycol, 1,4-butylene glycol, 1,5-pentane diol, neopentyl glycol, butylethylpropane diol, 1,6-hexane diol, 1,2-cyclohexane diol, 1,3-cyclohexaine diol, 1,4-cyclohexane diol, 1,2-cyclohexane dimethanol, 1,3-cyclohexane dimethanol, 1,4-cyclohexane dimethanol, 1,4-cyclohexane diethanol, 1,10-decamethylene glycol, 1,12-dodecane diol, polyethylene glycol, polytrimethylene glycol, polytetramethylene glycol, and the like may be mentioned. These polyalcohols may be used as one type individually, or may be used in combinations of two types or more.

In the ink composition of the present invention, for example, even if the resin (P) is blended in a high content of 3.0 weight % or more, the scaly metallic pigment can be prevented from agglomerating in the ink composition of the present invention, and nozzle clogging when inkjet printing can be prevented, while from the viewpoint of exhibiting excellent metal gloss, the content of the resin (P) in the ink composition of the present invention is preferably 15.0 weight % or less, more preferably 10.0 weight % or less. On the other hand, in the ink composition of the present invention, the content of the resin (P), from the viewpoint of increasing the rubfastness of the printed material, is preferably 3.0 weight % or more, more preferably 5.0 weight % or more.

In the ink composition of the present invention, from the viewpoint of efficiently coating the surface of the scaly metallic pigment, the weight ratio (resin P/scaly metallic pigment) of the resin (P) with respect to the scaly metallic pigment is preferably 0.05 to 50, more preferably 0.6 to 20.

Non-Reactive Solvent

The ink composition of the present invention may be one which does not include an non-reactive solvent which does not participate in the polymerization, but may have a content of 0.01 weight % to 5.00 weight %. If it is preferably 0.01 weight % to 2.00 weight %, it is possible to largely suppress the occurrence of bleeding due to poor curing. The metal tone becomes superior to those where it is not included at all.

In the present invention, when the non-reactive solvent is 0.10 to 1.50 weight %, it is possible to obtain a printed layer having a particularly excellent metal tone. Here, the amount of the non-reactive solvent included in the ink composition can be measured by GC. The non-reactive solvent amount in the present invention was quantified by the FID method, using a GC-14A produced by Shimadzu Corp.

As the non-reactive solvent of the present invention, an organic solvent commonly used in aqueous inks or organic solvent-based inks can be mentioned, and the boiling point is 60 to 190° C., preferably 70 to 150° C. Ethyl acetate, methyl acetate, methyl ethyl ketone, cyclohexane, 1-butanol, 2-butanol, and diethylene glycol diethyl ether and the like may be mentioned. The non-reactive solvent may be used as one type individually, or may be used in combinations of two types or more.

After the scaly metallic pigment of the present invention has been dispersed in this non-reactive solvent, it may be replaced by the polymerizable compound in a rotary evaporator or the like. At this time, it is preferably contained in the ink composition at 0.01 weight % to less than 5.00 weight %.

Other Pigments, Dyes

The ink composition of the present invention, besides the scaly metallic pigment, may also contain colorants such as pigments and dyes. As the colorant, depending on the objective and the required characteristics of the composition in the present invention, various pigments and dyes may be used to impart a glossy color such as black, white, magenta, cyan, yellow, green, orange, gold, silver, and the like. The content of the colorant may be suitably decided in consideration of the desired color density and the dispersibility in the composition and the like, and is not particularly limited, but is preferably 0.1 to 20 weight % with respect to the total amount (100 weight %) of the ink composition.

As the pigment, an inorganic pigment or an organic pigment may be used, and one kind may be used individually, or may be used in combinations of two kinds or more. The dye is not particularly limited, and for example, it is possible to use an acid dye, direct dye, reactive dye, and basic dye, and one kind may be used individually, or may be used in combinations of two kinds or more.

Other Additives Which May Be Included in the Ink Composition

The ink composition of the present invention may also include a photostabilizer. As the photostabilizer, a commercial photostabilizer may be used, and a cyanoacrylate-based compound, benzophenone-based compound, benzoate-based compound, benzotriazole-based compound, hydroxyphenyl triazine-based compound, benzylidene camphor-based compound, inorganic microparticles, and the like may be mentioned, and among these, hydroxyphenyl triazine-based compounds which have shorter wavelength ultraviolet absorption are preferred from the viewpoint of curability of the ink.

From the viewpoint of curability, it is preferable that the wavelength of irradiation of the active energy rays and the absorption wavelength of the photostabilizer should not overlap, as far as possible. Further, the content of the photostabilizer is preferably 0.1 to 15 weight % in the total weight of the ink composition, more preferably 0.2 to 5 weight %. These photostabilizers may be used as one type individually, or in combinations of two types or more.

The ink composition of the present invention may also further include a polymerization inhibitor. The content is preferably 0.0001 to 5 weight % in the total weight of the ink composition, more preferably 0.05 to 1 weight %.

As the polymerization inhibitor, a commercial polymerization inhibitor such as a hydroquinone-based compound, phenol-based compound, phenothiazine-based compound, nitroso-based compound, N-oxyl-based compound, and the like may be used. These polymerization inhibitors may be used as one type individually, or in combinations of two types or more.

The ink composition of the present invention may include a resin in order to suppress gelling in the ink caused by the scaly metallic pigment.

In the ink composition of the present invention, additives commonly used in the ink industry, for example, an antioxidant, a silane coupling agent, a plasticizer, a corrosion inhibitor, an non-reactive polymer, a pH adjusting agent, an anti-foaming agent, an electric charge control agent, a stress-relaxing agent, a penetrating agent, a surface regulator, the resin particles disclosed in Japanese Unexamined Patent Application, Publication No. 2017-52870, and the like, may be suitably selected and blended within a range which does not harm the objective of the present invention.

Preparation of the Ink Composition

The ink composition of the present invention is generally prepared by mixing at least the scaly metallic pigment, the polymerizable compound, and the photo initiator, and the various components suitably selected as required, and filtering using a filter having a pore size of about ⅒ or less of the nozzle diameter of the used inkjet print head.

Physical Properties of the Ink Composition

The ink composition of the present invention preferably has a viscosity at 40° C. of 5.0 to 30.0 mPa·s. If the viscosity of the ink at 40° C. is within the above-specified range, a favorable discharge stability can be obtained. Further, the viscosity of the ink can be measured using a rheometer (MCR301 manufactured by Anton Paar GmbH) at 40° C., with a shear rate of 100 s$^{-1}$.

Method for Predicting Metal Tone

Figure 1:
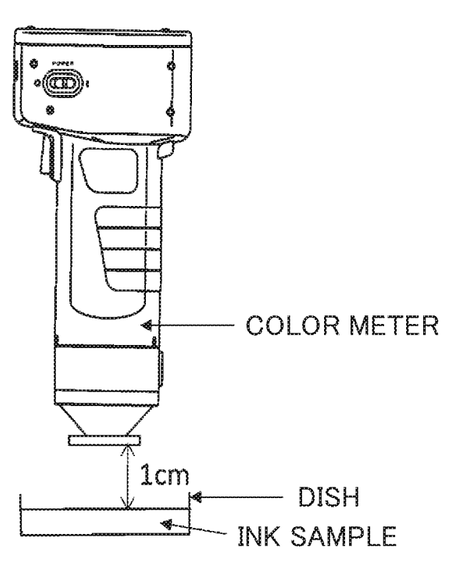
FIG. 1 is a drawing showing the measurement device of the present invention.

The metal tone of printed material according to the present invention can be predicted from the L* value obtained by measuring the liquid surface of the ink composition. For example, as shown in FIG. 1, the ink composition is put into a dish and allowed to stand, and the surface thereof is measured from a height of 1 cm using a color difference meter.

Field of Use

The active energy ray curable ink composition of the present invention is not particularly limited provided that it is one generally used in the field of active energy ray curable materials, and can be suitably selected corresponding to the objective, and for example, and applications such as resins for molding, paints, adhesives, insulating materials, release agents, coating materials, sealing materials, various resists, various optical materials and the like are possible, and it is particularly useful as an inkjet ink composition.

The ink composition of the present invention can be used for various inkjet printers. As an inkjet printer, for example, an inkjet printer which discharges the ink composition by an electric charge control technique or a piezo technique can be mentioned. Further, it may also be suitably used for large scale inkjet printers, specifically, inkjet printers which have the objective of printing products produced on an industrial line.

The material to be printed in the present invention is not particularly limited, and a substrate used in an industrial line may suitably be mentioned. Further, the shape of the material to be printed may for example be a sheet, a film, or the like. Furthermore, as the material of the material to be printed, for example, a plastic such as an ABS resin, a polycarbonate, a polyvinyl chloride, a polystyrene, a polymethyl methacrylate (PMMA), a polyethylene terephthalate (PET), a polypropylene (PP) and the like, a metal such as stainless steel, aluminum or the like, wood, and glass, and the like may be mentioned.

In the printing process of the present invention, using a printing method such as a one pass technique, the base material in a specified region is completely coated, and if the printed layer is to be smooth after the printing, a printed image having a mirror tone can be obtained. Using a printing method such as a multipass technique, in the case that the surface of printed layer is not smooth where a dot shape is retained, a printed image having a metal tone with a granular quality can be obtained.

EXAMPLES

Below, preferred embodiments of the present invention are explained in further detail, but the present invention is not in any way limited by the below examples.

Ink Composition of Embodiment 1

Preparation of Scaly Metallic Pigment Dispersion Liquid

An undercoat layer was formed on the PET film by uniformly coating, on a PET film with a film thickness of 100 μm, a 3.0 weight % undercoat liquid wherein a cellulose acetate butyrate (butyration degree 37%) dissolved in ethyl acetate. Next, by vacuum deposition, an aluminum deposition layer with an average film thickness of 25 nm was formed on the above described underlayer and a laminate was obtained. Using an ultrasound dispersion device, in ethyl acetate, the above described laminate was subjected to a simultaneous separation, refining and dispersion treatments, and a scaly metallic pigment dispersion liquid was produced.

The obtained scaly metallic pigment dispersion liquid was subjected to a filtration treatment with an SUS mesh filter with a 5 μm mesh, the coarse particles were eliminated, and scaly metallic pigment dispersion liquid 1 (below also referred to as dispersion liquid 1) with a $D_{50}=0.15$ μm and an average thickness=25 nm was obtained.

In the preparation of the ink composition, using the scaly metallic pigment dispersion liquid 1, the non-reactive solvent concentration was adjusted by distilling off the solvent using an intermediate evaporator, or by adding solvent. Using the same method, the scaly metallic pigment dispersion liquids 2 to 10 of Embodiment 1 disclosed in Table 1 were prepared. The units are weight %.

TABLE 1

| Composition of dispersion liquids | | | | | | | | | | |
|---|---|---|---|---|---|---|---|---|---|---|
| dispersion liquid No. | 1 | 2 | 3 | 4 | 5 | 6 | 7 | 8 | 9 | 10 |
| scaly metallic pigment | 10 | 10 | 10 | 10 | 10 | 10 | 10 | 10 | 10 | 10 |
| solvent | 90 | 90 | 90 | 90 | 90 | 90 | 90 | 90 | 90 | 90 |
| weight total | 100 | 100 | 100 | 100 | 100 | 100 | 100 | 100 | 100 | 100 |
| D50 particle diameter (μm) | 0.15 | 0.15 | 0.15 | 0.40 | 0.40 | 0.04 | 0.60 | 0.40 | 0.40 | 0.40 |
| thickness (nm) | 25 | 18 | 14 | 25 | 18 | 14 | 14 | 14 | 4 | 60 |

Synthesis of Resin (P)

In a flask provided with a thermometer, stirring device, nitrogen introduction pipe, and outlet pipe with a partial condenser, 320 parts by weight of isophthalic acid, 5 parts by weight of maleic anhydride, and 200 parts by weight of neopentyl glycol were introduced, and dehydration condensation reacted at 240° C. until reaching a predetermined acid value.

After this, the partial condenser was changed to a return current condenser equipped with a water diverting device, xylene was added, and further dehydration condensation reacted. After confirming that the target acid value and weight average molecular weight were reached, the xylene was eliminated with an evaporator, and a polyester resin was obtained.

Preparation of the Ink Composition

Using the below described scaly metallic pigment dispersion liquid, polymerizable compound, and photo initiator, these were adjusted to 100 weight % as the ink composition 1.

1) (A) scaly metallic pigment dispersion liquid: as solid aluminum content 2 weight %
2) (B) polymerizable compound:
a. 2-phenoxyethyl acrylate (manufactured by Kyoeisha Chemical Co., Ltd.) 30 weight %
b. 1,9-nonanediol diacrylate (manufactured by Kyoeisha Chemical Co., Ltd.) 30 weight %
c. isobornyl acrylate (manufactured by Kyoeisha Chemical Co., Ltd.) 27 weight %
d. 1,6-hexanediol diacrylate (manufactured by Kyoeisha Chemical Co., Ltd.) 0 weight %
3) (D) photo initiator:
2,4,6-trimethyl benzoyldiphenyl phosphine oxide (manufactured by Lambson) 10 weight %
4) resin (P): acid value 11, weight average molecular weight 6000
5) polymerization inhibitor: hydroquinone monomethyl ether (manufactured by Tokyo Chemical Industry Co., Ltd.) 0.2 weight %
6) non-reactive solvent: ethyl acetate 3.5 weight %

In the same way as for this method, the ink compositions 2 to 14 of Embodiment 1 shown in Table 2 were prepared. The units are weight %. Further, in the present examples, groups having a composition in common other than the scaly metallic pigment dispersion liquid of embodiment 1 were assigned the same ink composition number.

Storage Stability

The above ink compositions were placed in standstill storage for 28 days at 50° C., and the viscosity of the ink compositions was measured before and after storage, the ratio of change of the viscosity was determined, and the

TABLE 2

| | | Composition of ink compositions | | | | | | | | | | | | | |
|---|---|---|---|---|---|---|---|---|---|---|---|---|---|---|---|
| ink composition No | | 1 | 2 | 3 | 4 | 5 | 6 | 7 | 8 | 9 | 10 | 11 | 12 | 13 | 14 |
| scaly metallic pigment | | aluminum 2.0 | | | | | | | | | | | | | |
| polymerizable | a | 30 | 30 | 30 | 30 | 30 | 30 | 2 | 2 | 2 | 2 | 2 | 2 | 2 | 2 |
| compound | b | 30 | 30 | 30 | 30 | 30 | 25 | 25 | 25 | 25 | 25 | 25 | 25 | 25 | 25 |
| | c | 24.3 | 26 | 26.8 | 21.3 | 23 | 23.8 | 37.3 | 39 | 39.8 | 34.3 | 36 | 36.8 | 37.8 | 31.8 |
| | d | 0 | 0 | 0 | 0 | 0 | 0 | 20 | 20 | 20 | 20 | 20 | 20 | 20 | 20 |
| photo initiator | | 10 | 10 | 10 | 10 | 10 | 10 | 10 | 10 | 10 | 10 | 10 | 10 | 10 | 10 |
| rosin (P) | | 0 | 0 | 0 | 3 | 3 | 3 | 0 | 0 | 0 | 3 | 3 | 3 | 3 | 3 |
| Polymerization inhibitor | | 0.2 | 0.2 | 0.2 | 02 | 0.2 | 0.2 | 0.2 | 0.2 | 0.2 | 02 | 0.2 | 0.2 | 0.2 | 0.2 |
| non-reactive solvent | | 3.5 | 1.8 | 1 | 3.5 | 1.8 | 1 | 3.5 | 1.8 | 1 | 3.5 | 1.8 | 1 | 0.005 | 6 |
| weight total | | 100.0 | 100.0 | 100.0 | 100.0 | 100.0 | 100.0 | 100.0 | 100.0 | 100.0 | 100.0 | 100.0 | 100.0 | 100.0 | 100.0 |
| polyfunctional monomer in polymerizable compound (wt %) | | 35.6 | 34.9 | 34.6 | 36.9 | 36.1 | 35.8 | 53.4 | 52.3 | 51.8 | 55.4 | 54.2 | 53.7 | 53.1 | 57.1 |

Printing Method

Using an inkjet printer (print head nozzle diameter 30 μm, filter inside head 2300 mesh) and a UV-LED (irradiation strength 500 mw/cm$^2$, integrated light amount 500 mJ/cm$^2$), the print head was heated to 40° C. and printing was carried out with the base material temperature at a room temperature of 23° C. Further, as the base material a commercial polycarbonate plate was used.

Evaluation

The following evaluations were carried out, and the results are shown in Tables 3 to 9.

Metal Tone

For the obtained printed material, the lightness index (L value) of −15° to 110° was measured using a BYK-mac multi-angle colorimeter manufactured by BYK Gardner, and the metal tone was evaluated according to the below evaluation criteria from the FI value calculated by the below calculation formula.

$$FI = 2.69 \times (L^*15° - L^*110°)^{1.11}/(L^*45°)^{0.86} \quad \text{(formula)}$$

L*45: lightness index determined for received light in the perpendicular direction (normal direction), when light beam C is irradiated from a first angle inclined 45° with respect to the perpendicular direction, perpendicular to the surface of the metallic coating film
L*15°: lightness index determined for received light at a second direction raised 15° to the perpendicular direction with respect to the first direction (−30° with respect to the normal direction)
L*110°: lightness index determined for received light at a third direction inclined 110° to the perpendicular direction with respect to the first direction (65° with respect to the normal direction)
◎: Fill value is 12.0 or more
○: FI value is 10.0% to 11.9%
Δ: FI value is 8.0% to 9.9%
×: FI value is less than 8.0% storage stability was evaluated according to the below criteria. Further, the viscosity of the ink composition was measured using a rheometer (MCR301 manufactured by Anton Paar) at 40° C., with a shear rate of 100 s$^{-1}$.
◎: viscosity change rate is 0 to 4.9%
○: viscosity change rate is 5.0% to 9.9%
Δ: viscosity change rate is 10.0% to 19.9%
×: viscosity change rate is 20.0% or more

TABLE 3

| | Example | | | | | | | | | | | |
|---|---|---|---|---|---|---|---|---|---|---|---|---|
| Example No | 1 | 2 | 3 | 4 | 5 | 6 | 7 | 8 | 9 | 10 | 11 | 12 |
| dispersion liquid No | 1 | 2 | 3 | 4 | 5 | 6 | 1 | 2 | 3 | 4 | 5 | 6 |
| ink composition No | 1 | 1 | 1 | 1 | 1 | 1 | 2 | 2 | 2 | 2 | 2 | 2 |
| FI value | Δ | ○ | ◎ | Δ | ○ | ◎ | ○ | ○ | ◎ | ○ | ○ | ◎ |
| storage stability | ○ | ○ | ○ | ○ | ○ | ○ | ○ | ○ | ○ | ○ | ○ | ○ |

TABLE 4

| | Example | | | | | | | | | | | |
|---|---|---|---|---|---|---|---|---|---|---|---|---|
| Example No | 13 | 14 | 15 | 16 | 17 | 18 | 19 | 20 | 21 | 22 | 23 | 24 |
| dispersion liquid No | 1 | 2 | 3 | 4 | 5 | 6 | 1 | 2 | 3 | 4 | 5 | 6 |
| ink composition No | 3 | 3 | 3 | 3 | 3 | 3 | 4 | 4 | 4 | 4 | 4 | 4 |
| FI value | ○ | ◎ | ◎ | ○ | ◎ | ◎ | Δ | ○ | ◎ | Δ | ○ | ◎ |
| storage stability | ○ | ○ | ○ | ○ | ○ | ○ | ◎ | ◎ | ◎ | ◎ | ◎ | ◎ |

TABLE 5

| | Example | | | | | | | | | | | |
|---|---|---|---|---|---|---|---|---|---|---|---|---|
| Example No | 25 | 26 | 27 | 28 | 29 | 30 | 31 | 32 | 33 | 34 | 35 | 36 |
| dispersion liquid No | 1 | 2 | 3 | 4 | 5 | 6 | 1 | 2 | 3 | 4 | 5 | 6 |
| ink composition No | 5 | 5 | 5 | 5 | 5 | 5 | 6 | 6 | 6 | 6 | 6 | 6 |

TABLE 5-continued

| Example | | | | | | | | | | | | |
|---|---|---|---|---|---|---|---|---|---|---|---|---|
| Example No | 25 | 26 | 27 | 28 | 29 | 30 | 31 | 32 | 33 | 34 | 35 | 36 |
| FI value | ○ | ○ | ◎ | ○ | ○ | ◎ | ○ | ◎ | ◎ | ○ | ◎ | ◎ |
| storage stability | ◎ | ◎ | ◎ | ◎ | ◎ | ◎ | ◎ | ◎ | ◎ | ◎ | ◎ | ◎ |

TABLE 6

| Example | | | | | | | | | | | | |
|---|---|---|---|---|---|---|---|---|---|---|---|---|
| Example No | 37 | 38 | 39 | 40 | 41 | 42 | 43 | 44 | 45 | 46 | 47 | 48 |
| dispersion liquid No | 1 | 2 | 3 | 4 | 5 | 6 | 1 | 2 | 3 | 4 | 5 | 6 |
| ink composition No | 7 | 7 | 7 | 7 | 7 | 7 | 8 | 8 | 8 | 8 | 8 | 8 |
| FI value | △ | ○ | ◎ | △ | ○ | ◎ | ○ | ○ | ◎ | ○ | ◎ | ◎ |
| storage stability | ○ | ○ | ○ | ○ | ○ | ○ | ○ | ○ | ○ | ○ | ○ | ○ |

TABLE 7

| Example | | | | | | | | | | | | |
|---|---|---|---|---|---|---|---|---|---|---|---|---|
| Example No | 49 | 50 | 51 | 52 | 53 | 54 | 55 | 56 | 57 | 58 | 59 | 60 |
| dispersion liquid No | 1 | 2 | 3 | 4 | 5 | 6 | 1 | 2 | 3 | 4 | 5 | 6 |
| ink composition No | 9 | 9 | 9 | 9 | 9 | 9 | 10 | 10 | 10 | 10 | 10 | 10 |
| FI value | ○ | ◎ | ◎ | ○ | ◎ | ◎ | △ | ○ | ◎ | △ | ○ | ◎ |
| storage stability | ○ | ○ | ○ | ○ | ○ | ○ | ◎ | ◎ | ◎ | ◎ | ◎ | ◎ |

TABLE 8

| Example | | | | | | | | | | | | |
|---|---|---|---|---|---|---|---|---|---|---|---|---|
| Example No | 61 | 62 | 63 | 64 | 65 | 66 | 67 | 68 | 69 | 70 | 71 | 72 |
| dispersion liquid No | 1 | 2 | 3 | 4 | 5 | 6 | 1 | 2 | 3 | 4 | 5 | 6 |
| ink composition No | 11 | 11 | 11 | 11 | 11 | 11 | 12 | 12 | 12 | 12 | 12 | 12 |
| FI value | ○ | ○ | ◎ | ○ | ○ | ◎ | ○ | ◎ | ◎ | ○ | ◎ | ◎ |
| storage stability | ◎ | ◎ | ◎ | ◎ | ◎ | ◎ | ◎ | ◎ | ◎ | ◎ | ◎ | ◎ |

TABLE 9

| Comparative Example | | | | | | |
|---|---|---|---|---|---|---|
| Comparative Example No | 1 | 2 | 3 | 4 | 5 | 6 |
| dispersion liquid No | 7 | 8 | 9 | 10 | 6 | 6 |
| ink composition No | 9 | 9 | 9 | 9 | 13 | 14 |
| FI value | × | × | × | × | × | × |
| storage stability | ○ | ○ | ○ | ○ | × | × |

According to the above described results, in the ink compositions of the present invention, the expression of the metal tone according to the 50% volume average diameter and average thickness of the scaly metallic pigment and the content of the non-reactive solvent is remarkable, and it can also be understood that the storage stability is excellent.

Ink Composition of Embodiment 2

Preparation of Scaly Metallic Pigment Dispersion Liquid

The scaly metallic pigment dispersion liquids 1 and 2 of Embodiment 2 disclosed in Table 10 were prepared in the same way as for Embodiment 1. The units are weight %.

TABLE 10

| dispersion liquid No.. | 1 | 2 |
|---|---|---|
| scaly metallic pigment | 10 | 10 |
| solvent | 90 | 90 |
| weight total | 100 | 100 |
| D50 particle diameter(μm) | 0.6 | 0.4 |
| average thickness(nm) | 21 | 14 |

Synthesis of Resin (P)

A polyester resin (P) was obtained in the same way as for Embodiment 1.

Preparation of the Ink Composition

Using the below described scaly metallic pigment dispersion liquid, polymerizable compound, and photo initiator, these were adjusted to 100 weight % as the ink composition 1.
1) (A) scaly metallic pigment dispersion liquid: as solid aluminum content 1 weight %
2) (B) polymerizable compound:
a. triethylene glycol diacrylate (manufactured by Kyoeisha Chemical Co., Ltd.) 31.4 weight %
b. ethyl carbitol acrylate (manufactured by Kyoeisha Chemical Co., Ltd.) 30 weight %
c. aminoacrylate: EBECRYL7100 (manufactured by Daicell Allnix Ltd.) 8.0 weight %
d. trimethylolpropane triacrylate (manufactured by Kyoeisha Chemical Co., Ltd.) 14.8 weight %
3) dispersant
a. SOLSPERSE27000 (manufactured by Lubrizol Corp., nonionic, weight average molecular weight=821)
b. SOLSPERSE54000 (manufactured by Lubrizol Corp., nonionic, weight average molecular weight=3,046)
c. DISPERBYK-192 (manufactured by BYK, nonionic, weight average molecular weight=1,487)
DISPERBYK-168 (manufactured by BYK, amine value=11, weight average molecular weight=3,496)
e. BYK-9076 (manufactured by BYK, acid value=38, amine value=44, weight average molecular weight=3,914)
f. DISPERBYK-2013 (manufactured by BYK, acid value=8, amine value=18, weight average molecular weight=3,448)
4) resin (P): acid value 11, weight average molecular weight 6,000
5) (D) photo initiator:
2,4,6-trimethyl benzoyldiphenyl phosphine oxide (manufactured by Lambson) 8.0 weight %
6) polymerization inhibitor: hydroquinone monomethyl ether (manufactured by Tokyo Chemical Industry Co., Ltd.) 0.2 weight %
7) non-reactive solvent: ethyl acetate 3.5 weight %
The ink compositions 2 to 8 of Embodiment 2 disclosed in Table 11 were prepared in the same way as this method. The units are weight %. Further, in the present examples, groups having a composition. in common other than the scaly metallic pigment dispersion liquid were assigned the same ink composition number.

TABLE 11

| | | Composition of ink compositions | | | | | | | |
|---|---|---|---|---|---|---|---|---|---|
| | | 1 | 2 | 3 | 4 | 5 | 6 | 7 | 8 |
| (A) scaly metallic pigment | | 1.0 | 1.0 | 1.0 | 1.0 | 1.0 | 1.0 | 1.0 | 1.0 |
| (B) polymerizable | a | 31.4 | 31.4 | 31.4 | 31.4 | 31.4 | 31.4 | 31.4 | 31.4 |
| compound | b | 30.0 | 30.0 | 30.0 | 30.0 | 30.0 | 30.0 | 30.0 | 30.0 |
| | c | 8.0 | 8.0 | 8.0 | 8.0 | 8.0 | 8.0 | 8.0 | 8.0 |
| | d | 14.8 | 12.8 | 14.4 | 14.4 | 14.4 | 14.4 | 14.4 | 14.4 |
| (C) nonionic | a | 0.07 | 2.10 | 0.50 | | | | | |
| dispersant | b | | | | 0.50 | | | | |
| | c | | | | | 0.50 | | | |
| dispersant having | d | | | | | | 0.50 | | |
| acid value or amine | e | | | | | | | 0.50 | |
| value | f | | | | | | | | 0.50 |
| photo initiator | | 8.0 | 8.0 | 8.0 | 8.0 | 8.0 | 8.0 | 8.0 | 8.0 |
| resin (P) | | 3.0 | 3.0 | 3.0 | 3.0 | 3.0 | 3.0 | 3.0 | 3.0 |
| Polymerization inhibitor | | 0.2 | 0.2 | 0.2 | 0.2 | 0.2 | 0.2 | 0.2 | 0.2 |
| non-reactive solvent | | 3.5 | 3.5 | 3.5 | 3.5 | 3.5 | 3.5 | 3.5 | 3.5 |
| weight total | | 100.0 | 100.0 | 100.0 | 100.0 | 100.0 | 100.0 | 100.0 | 100.0 |
| weight ratio (C/A) | | 0.07 | 2.10 | 0.50 | 0.50 | 0.50 | 0 | 0 | 0 |
| weight ratio (C/B) | | 0.0008 | 0.0255 | 0.0060 | 0.0060 | 0.0060 | 0 | 0 | 0 |

Printing Method

Printing was carried out by the same printing method as in Embodiment 1.

Evaluation

The following evaluations were carried out, and the results are shown in Tables 12 to 13. The evaluations of the storage stability and metal tone were carried out in the same was as for Embodiment 1.

Corrosion Resistance of Print Head

Pellets of SUS03, SUS304, and SUS316, which are used in print heads, were immersed in the ink composition, and after leaving for a 28 day interval at 50° C., the corrosion degeneration state of the pellets was confirmed, and evaluated according to the below criteria.
o: no abnormality
x: corrosion confirmed

TABLE 12

| | Example | | | | | | | | | |
|---|---|---|---|---|---|---|---|---|---|---|
| Example No | 1 | 2 | 3 | 4 | 5 | 6 | 7 | 8 | 9 | 10 |
| dispersion liquid No | 1 | 2 | 1 | 2 | 1 | 2 | 1 | 2 | 1 | 2 |
| ink composition No | 1 | 1 | 2 | 2 | 3 | 3 | 4 | 4 | 5 | 5 |
| storage stability | Δ | Δ | ○ | ○ | ○ | ○ | ○ | ○ | ○ | ○ |
| metal tone (before storage stability test) | Δ | ○ | ○ | ◎ | ○ | ◎ | ○ | ◎ | ○ | ◎ |
| metal tone (after storage stability test) | Δ | Δ | Δ | ○ | ○ | ◎ | ○ | ◎ | ○ | ◎ |
| corrosion resistance of printer head | ○ | ○ | ○ | ○ | ○ | ○ | ○ | ○ | ○ | ○ |

TABLE 13

| | Comparative Example | | | | | |
|---|---|---|---|---|---|---|
| Comparative Example No | 1 | 2 | 3 | 4 | 5 | 6 |
| dispersion liquid No | 1 | 2 | 1 | 2 | 1 | 2 |
| ink composition No | 1 | 1 | 2 | 2 | 3 | 3 |
| storage stability | ○ | ○ | ○ | ○ | ○ | ○ |
| metal tone (before storage stability test) | ○ | ◎ | ○ | ◎ | ○ | ◎ |
| metal tone (after storage stability test) | X | X | X | X | X | X |
| corrosion resistance of printer head | X | X | X | X | X | X |

According to the above described results, it can be understood that in the ink composition of the present invention, not only the metal tone of printed material using the ink before the storage stability test, but also the expression of the metal tone of printed material using the ink after a storage stability test which reproduces long term storage, are excellent, and the corrosion resistance of the printer head is also excellent.

Ink Composition of Embodiment 3

Preparation of Scaly Metallic Pigment Dispersion Liquid

The scaly metallic pigment dispersion liquids 1 and 2 of Embodiment 3 disclosed in Table 14 were prepared in the same way as for Embodiment 1. The units are weight %.

TABLE 14

| dispersion liquid No | 1 | 2 |
|---|---|---|
| scaly metallic pigment | 10 | 10 |
| solvent | 90 | 90 |
| weight total | 100 | 100 |
| D50 particle diameter(μm) | 0.6 | 0.4 |
| average thickness(nm) | 21 | 14 |

Synthesis of Resin (P)

A polyester resin (P) was obtained in the same way as for Embodiment 1.

Preparation of the Ink Composition

Using the below described scaly metallic pigment dispersion liquid, polymerizable compound, and photo initiator, these were adjusted to 100 weight % as the ink composition 1.

7) polymerization inhibitor: hydroquinone monomethyl ether (manufactured by Tokyo Chemical Industry Co., Ltd.) 0.2 weight %

8) non-reactive solvent: ethyl acetate 1.0 weight %

The ink compositions 2 to 8 of Embodiment 3 disclosed in Table 15 were prepared in the same way as this method. The units are weight %. Further, in the present examples, groups having a composition in common other than the scaly metallic pigment dispersion liquid were assigned the same ink composition number.

TABLE 15

| | | Composition of ink compositions | | | | | | | |
|---|---|---|---|---|---|---|---|---|---|
| | | 1 | 2 | 3 | 4 | 5 | 6 | 7 | 8 |
| (A) scaly metallic pigment | | 1.0 | 1.0 | 1.0 | 1.0 | 1.0 | 1.0 | 1.0 | 1.0 |
| (B) polymerizable compound | a | 25.0 | 25.0 | | 30.0 | | 18.0 | | 68.0 |
| | b | | | 52.0 | | | 48.3 | 52.0 | |
| | c | 5.0 | 5.0 | | | | | | 4.3 |
| | d | 36.3 | 36.3 | | | 36.3 | | | |
| | e | | | 14.3 | 41.3 | 25.0 | | | |
| | f | | | | | | 10.0 | | |
| | g | | | 10.0 | | | | 15.0 | |
| | h | 10.0 | 10.0 | | | | | 9.3 | 4.0 |
| | i | | | | | 15.0 | | | |
| | j | 10.0 | 10.0 | 10.0 | 15.0 | | 10.0 | 10.0 | 10.0 |
| (C) photo initiator | | 8.0 | 8.0 | 8.0 | 8.0 | 8.0 | 8.0 | 8.0 | 8.0 |
| (D) nonionic dispersant | | 0.5 | | 0.5 | 0.5 | 0.5 | 0.5 | 0.5 | 0.5 |
| dispersant having acid value or amine value | | | 0.5 | | | | | | |
| resin (P) | | 3.0 | 3.0 | 3.0 | 3.0 | 3.0 | 3.0 | 3.0 | 3.0 |
| polymerization inhibitor | | 0.2 | 0.2 | 0.2 | 0.2 | 0.2 | 0.2 | 0.2 | 0.2 |
| non-reactive solvent | | 1.0 | 1.0 | 1.0 | 1.0 | 1.0 | 1.0 | 1.0 | 1.0 |
| weight total | | 100.0 | 100.0 | 100.0 | 100.0 | 100.0 | 100.0 | 100.0 | 100.0 |

1) (A) scaly metallic pigment dispersion liquid: as solid aluminum content 1 weight %
2) (B) polymerizable compound:
a. ethoxy-diethylene glycol acrylate
b. isobornyl acrylate
c. tetrahydrofurfuryl acrylate
d. phenoxyethyl acrylate
e. triethylene glycol diacrylate
f. neopentylglycol diacrylate
g. 1,9-nonanediol diacrylate
h. 1,6-hexanediol diacrylate
i. caprolactane-modified hydroxyethyl acrylate
j. trimethylolpropane triacrylate
3) (C) Nonionic Dispersant:
DISPERBYK-192 (manufactured by BYK, nonionic, weight average molecular weight=1,487)
4) (D) photo initiator:
2,4,6-trimethyl benzoyldiphenyl phosphine oxide (manufactured by Lambson) 8.0 weight %
5) dispersant having acid value or amine value:
DISPERBYK-2013 (manufactured by BYK, acid value=8, amine value=18, weight average molecular weight=3,448)
6) resin (P): acid value 11, weight average molecular weight 6,000

Printing Method

Printing was carried out by the same printing method as in Embodiment 1.

Evaluation

The following evaluations were carried out, and the results are shown in Tables 16 and 17. Unless noted otherwise, the measurements were carried out under atmosphere at 23° C., 55% RH. The evaluations of the storage stability and metal tone were carried out in the same was as for Embodiment 1.

Method of Predicting Metal Tone

The prepared ink before storage and after storage was put into a dish, a color meter CR-400 (manufactured by Konica Minolta) was fixed at a position such that the measurement portion was 1 cm from the liquid surface, and the L* value was measured.

○: L* value was 50 or more
Δ: L* value was 30 to less than 50
×: L* value was less than 30

TABLE 16

| | Example | | | | | | | | | |
|---|---|---|---|---|---|---|---|---|---|---|
| Example No | 1 | 2 | 3 | 4 | 5 | 6 | 7 | 8 | 9 | 10 |
| dispersion liquid No | 1 | 2 | 1 | 2 | 1 | 2 | 1 | 2 | 1 | 2 |
| ink composition No | 1 | 1 | 2 | 2 | 3 | 3 | 4 | 4 | 5 | 5 |
| metal tone (before storage stability test) | ○ | ⊚ | ○ | ⊚ | ○ | ⊚ | ○ | ⊚ | ○ | ⊚ |
| metal tone (after storage stability test) | ○ | ○ | Δ | Δ | ○ | ○ | ○ | ○ | ○ | ○ |
| metal tone prediction (ink before storage) | ○ | ○ | ○ | ○ | ○ | ○ | ○ | ○ | ○ | ○ |
| metal tone prediction (ink after storage) | ○ | ○ | Δ | Δ | ○ | ○ | ○ | ○ | ○ | ○ |

TABLE 17

| | Comparatative Example | | | | | |
|---|---|---|---|---|---|---|
| Comparative Example No | 1 | 2 | 3 | 4 | 5 | 6 |
| dispersion liquid No | 1 | 2 | 1 | 2 | 1 | 2 |
| ink composition No | 6 | 6 | 7 | 7 | 8 | 8 |
| metal tone (before storage stability test) | x | Δ | x | Δ | x | Δ |
| metal tone (after storage stability test) | x | x | x | x | x | x |
| metal tone prediction (ink before storage) | x | Δ | x | Δ | x | Δ |
| metal tone prediction (ink after storage) | x | x | x | x | x | x |

According to the above described results, it can be understood that in the ink composition of the present invention, not only the metal tone of printed material using the ink before the storage stability test, but also the expression of the metal tone of printed material using the ink after a storage stability test which reproduces long term storage, are excellent. Further, prediction of the metal tone according to the present invention conforms well to the metal tone of the actual printed material.

The invention claimed is:

1. An active energy ray curable ink composition comprising at least (A) a scaly metallic pigment, (B) a polymerizable compound, (D) a photo initiator, and a non-reactive solvent, wherein the scaly metallic pigment has a 50% volume average diameter of 0.05 μm or more and less than 0.5 μm, an average thickness of 5.0 nm or more and less than 50 nm, and an aspect ratio (50% volume average diameter/average thickness) of 4 to 50, and wherein the non-reactive solvent has a boiling point of 60° C. to 190° C. and a content of the non-reactive solvent is 0.01 weight % to 5.00 weight %.

2. The active energy ray curable ink composition according to claim 1, further comprising a resin (P) with a weight average molecular weight of 12000 or less, and with an acid value of 5 to 100.

3. The active energy ray curable ink composition according to claim 1, wherein the polymerizable compound comprises 50 weight % or more of a polyfunctional monomer.

4. The active energy ray curable ink composition according to claim 2, wherein the polymerizable compound comprises 50 weight % or more of a polyfunctional monomer.

\* \* \* \* \*